(12) United States Patent
Makifuchi (10) Patent No.: US 7,667,909 B2
(45) Date of Patent: Feb. 23, 2010

(54) SLEW-RATE CONTROL DEVICE, STORAGE DEVICE, AND SLEW-RATE CONTROL METHOD

(75) Inventor: Masaki Makifuchi, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 477 days.

(21) Appl. No.: 11/652,965

(22) Filed: Jan. 12, 2007

(65) Prior Publication Data
US 2008/0062552 A1 Mar. 13, 2008

(30) Foreign Application Priority Data
Sep. 11, 2006 (JP) ............................. 2006-245806

(51) Int. Cl.
*G11B 20/18* (2006.01)
(52) U.S. Cl. ........................................................ 360/31
(58) Field of Classification Search ........................ None
See application file for complete search history.

(56) References Cited

U.S. PATENT DOCUMENTS

| 6,005,890 | A  | * | 12/1999 | Clow et al. | 375/221 |
| 6,194,935 | B1 | * | 2/2001  | Pioppo et al. | 327/170 |
| 6,429,708 | B2 | * | 8/2002  | Asano et al. | 327/170 |
| 7,110,214 | B1 | * | 9/2006  | Tu et al. | 360/78.06 |

FOREIGN PATENT DOCUMENTS

| JP | 2001-014811 | 1/2001 |
| JP | 2001-222474 | 8/2001 |

* cited by examiner

*Primary Examiner*—Mark Blouin
(74) *Attorney, Agent, or Firm*—Greer, Burns & Crain, Ltd.

(57) ABSTRACT

A slew-rate control device controls a slew rate of a control signal based on which data reading or data writing is performed with respect to a storage medium. A retry executing unit changes, when an error occurs during the data reading or the data writing, the slew rate of the control signal, and executes a retry of the data reading or the data writing. A slew-rate setting unit sets, as the slew rate of the control signal, a slew rate with which the retry is successfully executed.

18 Claims, 7 Drawing Sheets

SLEW-RATE CONTROL DEVICE, STORAGE DEVICE, AND SLEW-RATE CONTROL METHOD

BACKGROUND OF THE INVENTION

1. Field of the Invention

The present invention relates to a technology for setting an optimum slew rate of a control signal regardless of compatibility with a host device.

2. Description of the Related Art

Conventionally, a slew rate of a control signal (an interface signal) exchanged between a host device and a storage device such as a magnetic disk device in a computer system is set on the basis of transfer mode supported by the storage device and the host device.

The slew rate is a rate of change in voltage of an output signal (time-dependent voltage change) when changing an output signal voltage according to a change in an input signal voltage, having a unit of volts per second [V/s].

The slew rate set in the storage device is set for each transfer mode separately on the basis of evaluation value at the time of shipment, or is set according to the transfer mode supported by the host device at the time of starting a computer as disclosed in Japanese Patent Application Laid-Open No. 2001-222474.

However, an electromagnetic interference (EMI) created within the computer system generates a noise in the interface signal. Such noise gives rise to multiple errors in the data read or the data write of the storage medium of the magnetic disk, which increases repetition of a retry and degrades a performance of the magnetic disk.

Thus, it is evident that changing a slew rate setting value of the interface signal is effective in preventing degradation of the performance caused by the EMI.

However, a degree of influence of the EMI differs according to compatibility of the host device with the storage device. Specifically, the degree of influence of the EMI differs according to an environment and a configuration of a computer system, even though the host device and the storage device connected together are of the same standard.

The degree of influence of the EMI cannot be estimated until the host device and the storage device are actually in operation after being connected together. Therefore, it is difficult to predict an optimum setting value for the slew rate to prevent degradation of the performance due to the EMI influence

SUMMARY OF THE INVENTION

It is an object of the present invention to at least partially solve the problems in the conventional technology.

A slew-rate control device according to one aspect of the present invention controls a slew rate of a control signal based on which data reading or data writing is performed with respect to a storage medium. The slew-rate control device includes a retry executing unit that changes, when an error occurs during the data reading or the data writing, the slew rate of the control signal, and executes a retry of the data reading or the data writing; and a slew-rate setting unit that sets, as the slew rate of the control signal, a slew rate with which the retry is successfully executed.

A storage device according to another aspect of the present invention controls a slew rate of a control signal based on which data reading or data writing is performed with respect to a storage medium. The storage device includes a retry executing unit that changes, when an error occurs during the data reading or the data writing, the slew rate of the control signal, and executes a retry of the data reading or the data writing; and a slew-rate setting unit that sets, as the slew rate of the control signal, a slew rate with which the retry is successfully executed.

A method according to still another aspect of the present invention is for controlling a slew rate of a control signal based on which data reading or data writing is performed with respect to a storage medium. The method includes retry executing including changing, when an error occurs during the data reading or the data writing, the slew rate of the control signal, and executing a retry of the data reading or the data writing; and setting, as the slew rate of the control signal, a slew rate with which the retry is successfully executed.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be explained in detail below with reference to the accompanying drawings. In the following description, the present invention is applied to a magnetic disk device according to the embodiment.

Figure 1:
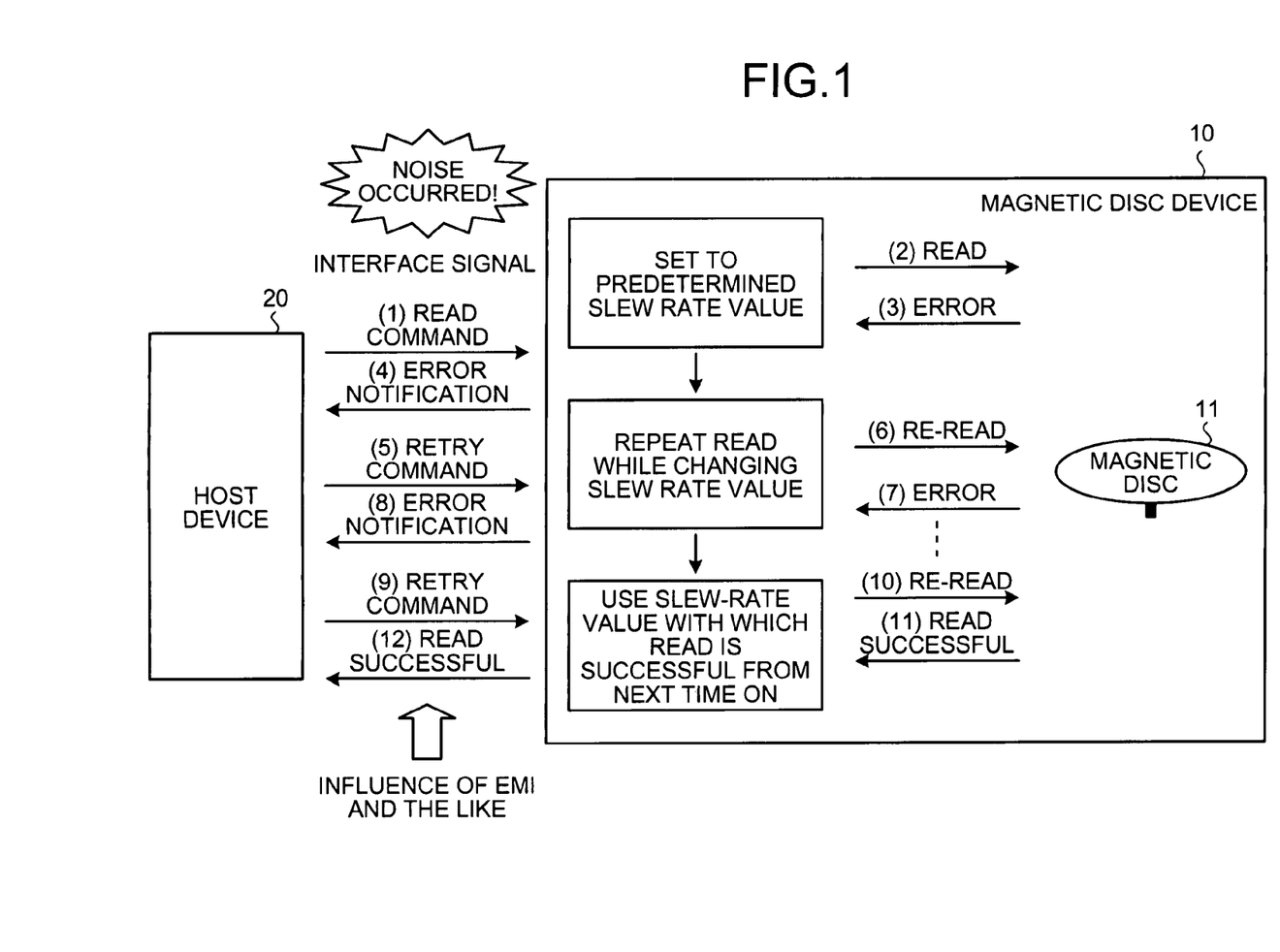
FIG. 1 is a schematic for explaining an outline of a magnetic disk device according to a first embodiment of the present invention.

FIG. 1 is a schematic for explaining an outline of a magnetic disk device 10 according to a first embodiment of the present invention. The magnetic disk device 10 is connected to a host device 20 such as a mother board of a computer, and data stored on a magnetic disk 11 is reproduced (read) or data is written (write) on the magnetic disk 11 based on a read command or a write command transmitted from the host device 20 through an interface signal.

The magnetic disk device 10 receives the interface signal including the read command from the host device 20 ((1) in FIG. 1), sets a slew-rate value of the interface signal to a predetermined slew-rate value within the device, and reads data on the magnetic disk 11 ((2) in FIG. 1).

When an error occurs during a process of reading data from the magnetic disk device 10 ((3) in FIG. 1), the host device 20 is notified about the error ((4) in FIG. 1). In response to a notification of the error, an interface signal including a retry command is received from the host device 20 ((5) in FIG. 1). The magnetic disk device 10 changes a preset slew-rate value to another slew-rate value, accepts the interface signal, and tries to read the data again ((6) in FIG. 1).

In this way, the magnetic disk device 10 continues the change of the slew-rate value and the data read operation based on the retry command transmitted by the host device 20 until the data read operation is successful ((7) to (12) in FIG. 1). When the data read operation is successful, the magnetic disk device 10 sets the slew-rate value used for the data read operation as a slew-rate value to be used for fetching the interface signal at a later stage.

Although the above explanation is about the read command, the same scheme applies to the write command as well. The slew-rate value changes at each retry, and the slew-rate value at a successful write is set as a set slew-rate value to be used for fetching the interface signal at a later stage.

Thus, the magnetic disk device 10 according to the first embodiment carries out the read or the write by changing the slew-rate value of the interface signal during the retry that is performed when an error occurs during the read and the write. Because the slew-rate value obtained during the successful read or write is set as the slew-rate value for fetching the interface signal at a later stage, an optimization of the slew rate for interface signal is possible regardless of compatibility with the host device.

Figure 2:
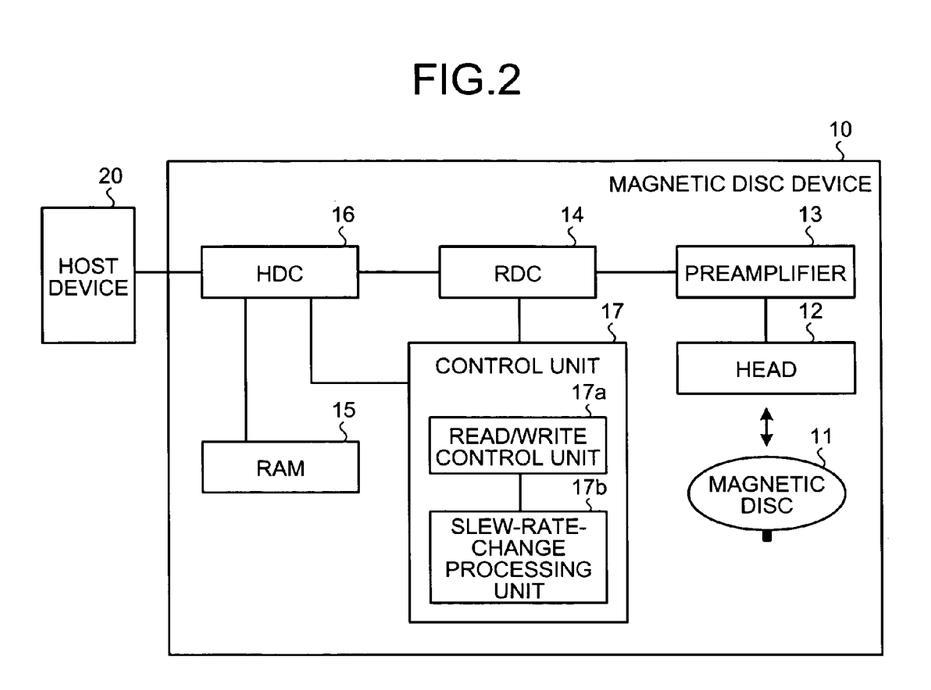
FIG. 2 is a functional block diagram of the magnetic disk device according to the first embodiment.

FIG. 2 is a functional block diagram of the magnetic disk device 10. The magnetic disk device 10 is connected to the host device 20 via an interface, such as a small computer system interface (SCSI) or an advanced technology attachment (ATA). The host device 20 is a device such as a computer motherboard, and data or control commands (read command/write command) are exchanged between the magnetic disk device 10 and the host device 20 through an interface signal.

The magnetic disk device 10 includes the magnetic disk 11, a head 12, a preamplifier 13, a read channel (RDC) 14, a random access memory (RAM) 15, a hard disk controller (HDC) 16, a control unit (central processing unit) 17. The magnetic disk device 10 is practically includes function units that are included in an ordinary magnetic disk device, such as a voice coil motor (VCM) that drives the head 12, a spindle motor (SPM) that rotates the magnetic disk 11, a motor driver that controls the VCM and the SPM; however, a detailed explanation about such function units is omitted.

The magnetic disk 11 is a storage medium for storing data. The head 12 is a magnetic head that reads magnetic data stored on the magnetic disk 11, and converts read magnetic data into a reading signal or converts a writing signal into magnetic data, and writes converted magnetic data on the magnetic disk 11.

The preamplifier 13 is a large-scale integration (LSI) that amplifies the reading signal transmitted from the head 12 and a writing signal to be transmitted to the head 12. The RDC 14 mainly performs a code demodulation of data read from the magnetic disk 11 and a code modulation of data to be written on the magnetic disk 11.

The RAM 15 is a volatile memory for loading a firmware therein. The firmware is stored in a nonvolatile memory (not shown) such as a read only memory (ROM), and is read and implemented by the control unit 17 after being loaded in the RAM 15.

The HDC 16 is an LSI that mainly carries out an interface control between the host device 20 and the magnetic disk device 10 and an interface control of each internal unit of the magnetic disk device 10. The HDC 16 sets the slew rate of the interface signal to a predetermined slew rate value for processing the interface signal transmitted by the host device 20. The HDC 16 retains a plurality of slew-rate setting values as register values. A switching of the slew-rate setting values makes it possible to change the slew rate of the interface signal received from the host device 20 and the slew rate of the interface signal transmitting to the host device 20 to a plurality of slew-rate values.

Figure 3:
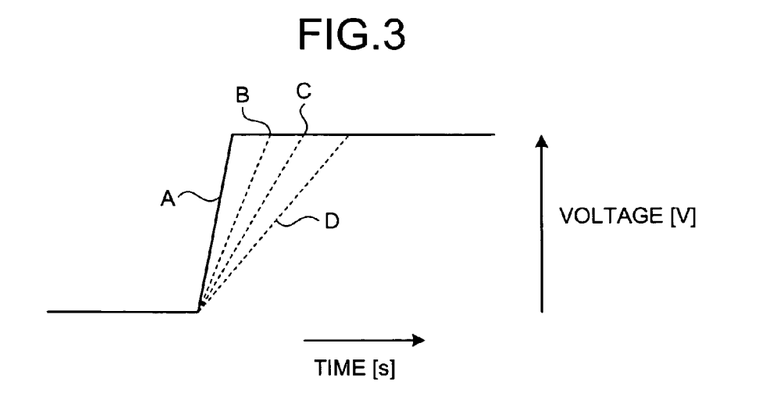
FIG. 3 is a schematic for explaining a relation between a slew-rate setting value and a slew-rate value.

For example, it is assumed that the HDC 16 retains four different types of slew-rate setting values A to D. Each of the slew-rate setting values is associated with a predetermined slew-rate value. FIG. 3 is a schematic for explaining a relation between the slew-rate setting value and the slew-rate value. As shown in the figure, the slew-rate setting values A, B, C, and D correspond to the slew-rate values having different rates of change, respectively.

Although four types of slew-rate setting values are used in the above example, the number of slew-rate setting values is not limited to four, but can be set arbitrarily according to a required degree of accuracy The control unit 17 is a processing unit that performs an overall control of the magnetic disk device 10 by executing the firmware, which includes a read/write control unit 17a and a slew-rate-change processing unit 17b as function units to carry out processes related to the present invention.

The read/write control unit 17a controls a processing related to a read/write command fetched from the host device 20 via the HDC 16. Upon receiving a read command or a write command from the host device 20 via the HDC 16, the read/write control unit 17a performs reading or writing of data with respect to the magnetic disk 11 via the RDC 14, the preamplifier 13, and the head 12.

When an error occurs during the read or the write operation the read/write control unit 17a carries out a retry within the magnetic disk device 10 (hereinafter, "an internal retry") for a predetermined number of times while changing various types of parameters set for the read/write operation. If the read/write operation is not successful in the internal retry, the read/write control unit 17a sends an error notification to the host device via the HDC 16.

When a retry demand is sent from the host device 20 in response to the error notification, the read/write control unit 17a tries the read/write operation again for the same data. When a retry is carried out based on the retry demand from the host device 20 (hereinafter, "an external retry"), the slew-rate-change processing unit 17b carries out a change of the slew rate of the interface signal. The read/write control unit 17a continues to retry (the external retry and the internal retry) until the read/write operation becomes successful. The read/write control unit 17a sets the slew-rate value for the interface signals received from the host device 20 and the interface signals sent to the host device 20, based on the slew-rate setting value set at that point.

The slew-rate-change processing unit 17b is a processing unit that substitutes the slew-rate setting value of the HDC 16, based on the number of retries. The slew-rate-change processing unit 17b calculates the number of retries conducted by the read/write control unit 17a, depending on the number of retries, and instructs to change the slew-rate setting value for the HDC 16. In an example below, the slew-rate-change processing unit 17b instructs to change the slew-rate setting value according to the number of retries indicated in Table 1.

TABLE 1

| | Slew-rate setting value |
|---|---|
| Initial value | A |
| x-th Retry | B |
| y-th Retry | C |
| z-th Retry | D |

Figure 4:
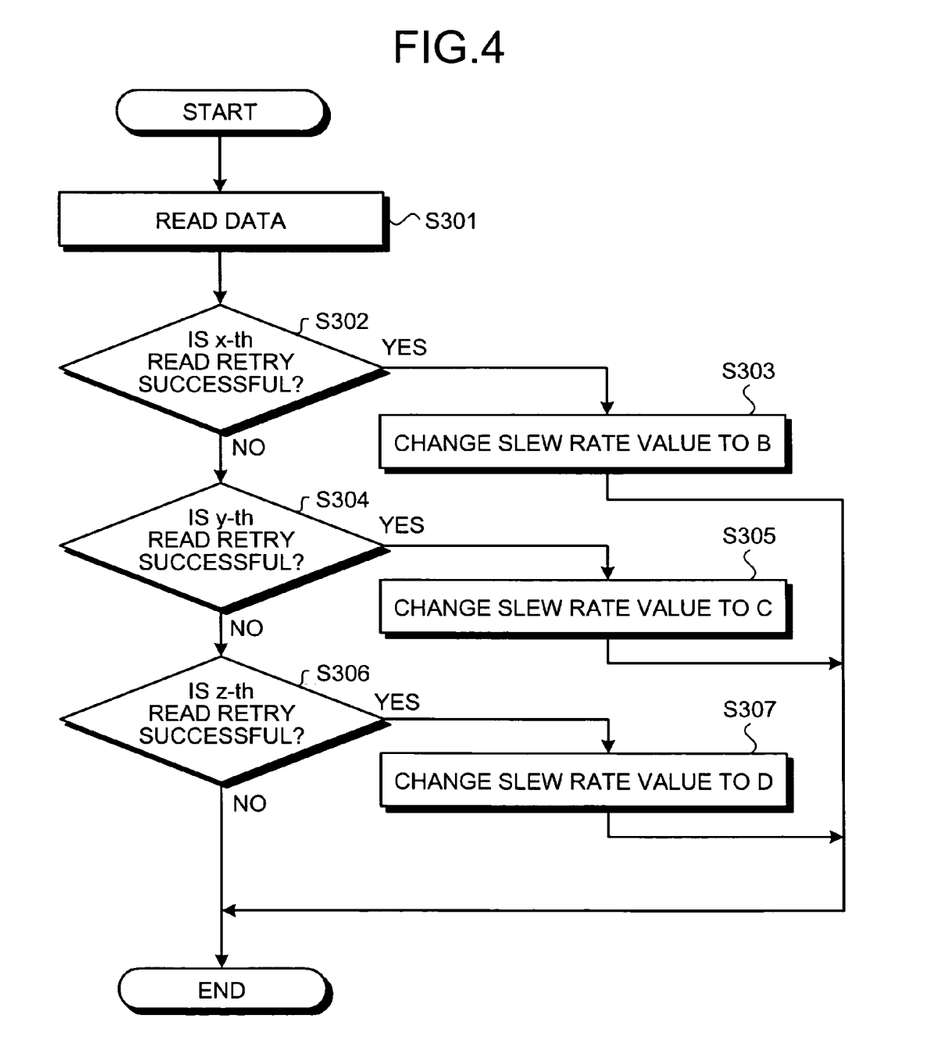
FIG. 4 is a flowchart of a slew-rate changing process performed by the magnetic disk device according to the first embodiment.

In Table 1, if the maximum number of internal retries is r, the numbers of retries x, y, and z are set as $x=r+1$, $y=x+r+1$, and $z=x+y+r+1$. Although the number of retries is set as an initial value (0)<x<y<z, a magnitude relation between the slew-rate values determined by a slew-rate value corresponding to each stage is not necessarily to be slew-rate value of A<slew-rate value of B<slew-rate value of C<slew-rate value of D, but can be set arbitrarily. Although the number of retries and the slew-rate values are four types in the above example, but the number of retry and slew-rate setting values need not be limited to the same and can be set according to the degree of accuracy. FIG. 4 is a flowchart of a procedure of a slew-rate change by the magnetic disk device 10.

When the magnetic disk device 10 receives a read command from the host device 20, the read/write control unit 17*a* executes the read operation for the magnetic disk 11 via the RDC 14, the preamplifier 13, and the head 12 (step S301).

If an error occurs when the read/write control unit 17*a* is executing the read operation, the internal retry is executed for only predetermined number of times. If the read operation is not successful during the internal retry, an error notification is sent to the host device 20. When a retry demand is received from the host device 20 in response to the error notification, the read/write control unit 17*a* repeats the read operation for the same data.

At this stage, if the number of retries is x (step S302), the slew-rate-change processing unit 17*b* changes the slew-rate setting value of the HDC 16 from the initial value A to B. If the read by the read/write control unit 17*a* is successful, the slew-rate setting value leaves the slew-rate setting value changed to B (step S303).

If the number of retries is y (step S304, Yes), the slew-rate-change processing unit 17*b* changes the slew-rate setting value of the HDC 16, from the initial value A to C. If the read by the read/write control unit 17*a* is successful, the slew-rate setting value leaves the slew-rate setting value changed to C (step S305).

If the number of retries is z (step S306, Yes), the slew-rate-change processing unit 17*b* changes the slew-rate setting value of the HDC 16 from the initial value A to D. If read by the read/write control unit 17*a* is successful, the slew-rate setting value leaves the slew-rate setting value changed to D (step S307).

According to the first embodiment, if an error occurs during the data read or write, the read/write control unit 17*a* performs a retry after changing the slew-rate value of the interface signal, and when the slew-rate-change processing unit 17*b* is successful in the retry, the slew-rate value is set as the slew-rate value of the interface signal. Thus it is possible to set the slew-rate value based on the results of actual execution of the data read or write, and an optimum slew-rate value can be set regardless of compatibility with the host device 20.

Furthermore, according to the first embodiment, the slew-rate-change processing unit 17*b* counts the number of retries and changes the slew-rate based on counted number of retries, and the read/write control unit 17*a* executes a retry with changed slew rate. Therefore, it, is possible to change the slew-rate automatically according to the number of retries, and to detect an optimum slew rate.

It is also possible to detect the optimum slew-rate by repeating the retry by utilizing a spare time gained during data transfer with the host device 20. Explained below in a second embodiment is utilization of the spare time for detecting the slew-rate.

A configuration of a magnetic disk device according to the second embodiment is basically same as that of the magnetic disk device 10 according to the first embodiment and the only difference is in a procedure of slew-rate change involving the read/write control unit 17*a* and the slew-rate-change processing unit 17*b*. So the explanation is given only about the slew-rate change procedure.

Figure 5:
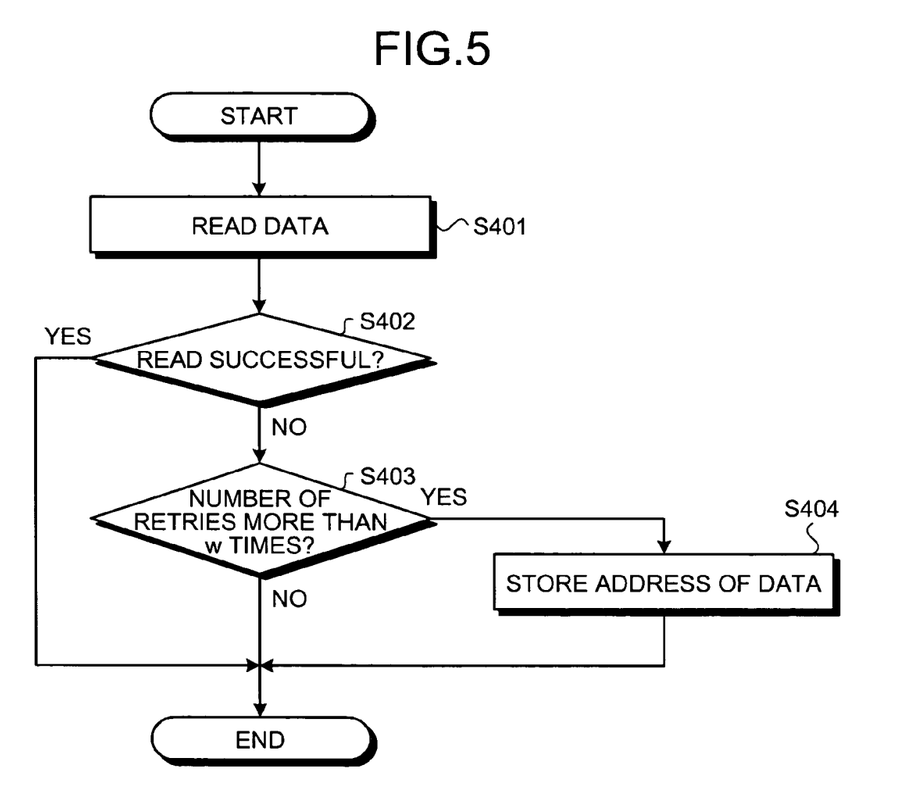
FIGS. 5 and 6 are flowcharts of a slew-rate changing process performed by a magnetic disk device according to a second embodiment of the present invention.
Figure 6:
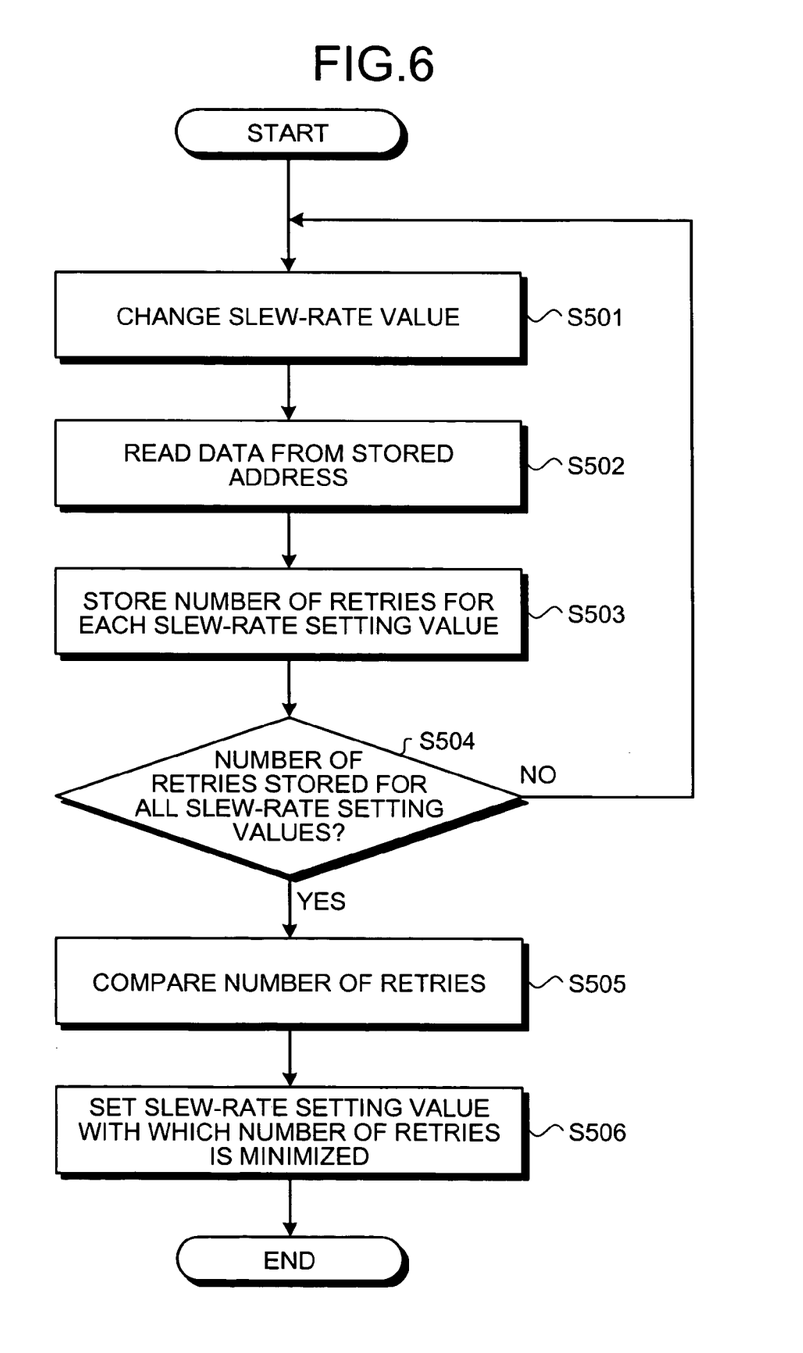

FIGS. 5 and 6 are flowcharts (1) and (2) of the slew-rate change procedure performed by the magnetic disk device according to the second embodiment. In FIG. 5 when the magnetic disk device according to the second embodiment receives the read command from the host device 20 the read/write control unit 17*a* performs the data read operation by the magnetic disk 11 via the RDC 14, the preamplifier 13 and the head 12 (step S401).

When an error occurs during the read operation (step S402, No) the read/write control unit 17*a* carries out an internal retry for a predetermined number of times. If read is not successful in the internal retry the read/write control unit 17*a* sends an error notification to the host device20. When the retry command is received from the host device 20 in response to the error notification the read/write control unit 17*a* tries the read operation again for the same data (external retry).

The read/write control unit 17*a* returns to step S401 and continues the retry (internal and external retry) until successful. However, if the number of retry exceeds the predetermined threshold w (step S403, Yes), the read/write control unit 17*a* stores an address of a data that is an object of the read.

When the read/write control unit 17*a* detects that no data transfer is occurring with the host device 20 for a predetermined period of time the read/write control unit 17*a* demands for predetermined read command to the host device 20. When the read/write control unit 17*a* receives the read demand from the host device 20 the read/write control unit 17*a* controls the slew-rate-change processing unit 17*b* and changes the slew-rate value of the interface signal that includes the read demand (step S501). Based on the read demand after the changed slew-rate the read/write control unit 17*a* reads data of an address stored at that point (step S502).

Thus the read/write control unit 17*a* tries the read operation for all the possible slew-rate values on the HDC 16, calculates the number of retry needed for each slew-rate setting value and stores the same (step S503).

When the number of retry for all slew-rate value are stored (step S504, Yes), the read/write control unit 17*a* compares the stored number of retry (step S505) and selects a slew-rate setting value that has the minimum number of retry, and instructs the slew-rate-change processing unit 17*b* to set the slew-rate setting value (step S506).

Thus the read/write control unit 17*a* in the second embodiment calculates number of retry. When the calculated number of retry exceeds the threshold, a repeated retry is executed while changing the slew-rate. A slew rate that is obtained with the minimum number of repeated retry is set as the slew rate of the control signal. As a result of an actual read or write of data it is possible to detect a slew-rate that may not need a retry.

When the interface signal does not have any interaction for a predetermined time, the read/write control unit 17*a* in the second embodiment executes repeated retry. So a procedural burden at the time of a retry can be reduced as compared to the procedure of the change of the slew-rate in a normal case of the read or the write. operation.

The explanation above is regarding detecting an optimum slew-rate for a data that is an object of the read command received after exceeding the threshold of retry and is read again. The procedure can be applied for detecting an optimum slew-rate by reading a data that is written on a prescribed dummy area of the magnetic disk 11.

Figure 7:
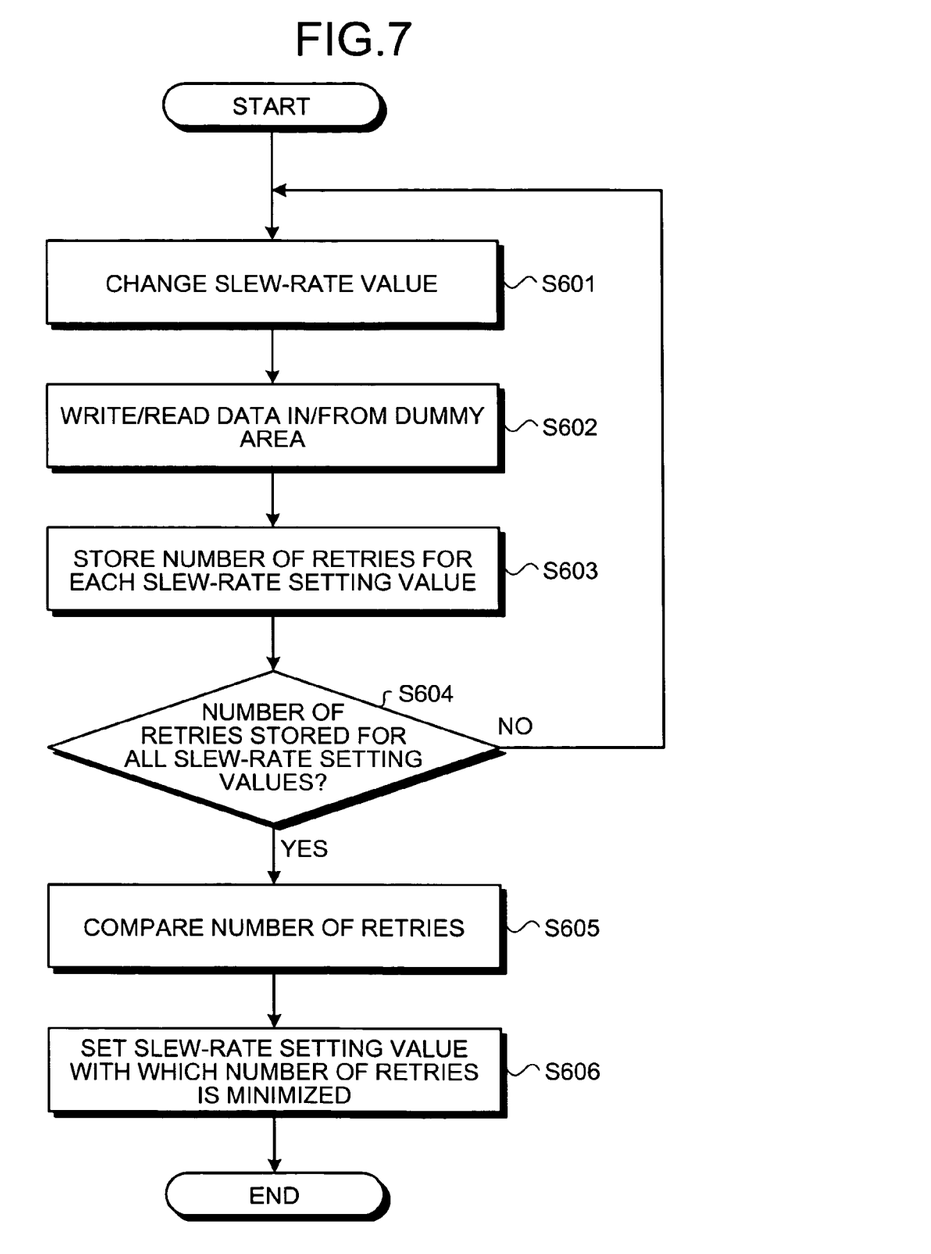
FIG. 7 is a flowchart of the slew-rate changing process when a dummy area is used.

FIG. 7 is a flowchart of a procedure of a slew-rate change when a dummy area is used. The flowchart in the figure is same as the flowchart in FIG. 6 and according to the process explained in step S502 in FIG. 6 the stored data written on the dummy area is read (refer to step S602).

Such usage of the dummy area allows avoiding a danger of any damage to data that is stored on a user data storing area of the magnetic disk 11 through repeated retry.

A data that is to be written on the dummy area can be modified to a special pattern of data, which is more prone to create noise in the interface signal. The special pattern of data can be "0000FFFF". The data can be configured of a combination of a bit string of 16 continuous bits with the value "0" and a bit string of 16 continuous bits with the value "1". The special pattern of data can be "0000FFFF", a pattern more prone to create noise because the ordinary bit strings can be interchanged.

Figure 8:
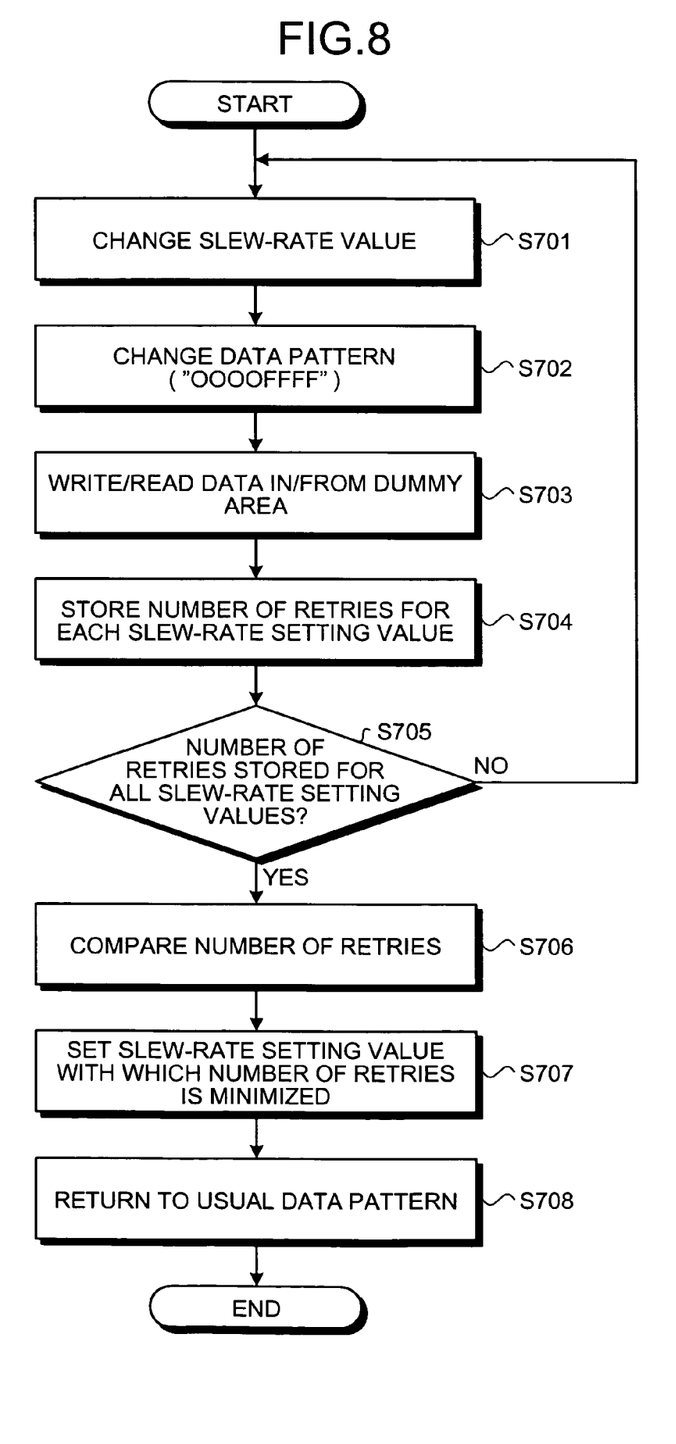
FIG. 8 is a flowchart of the slew-rate changing process when a special data pattern is used.

FIG. 8 is a flowchart of a procedure of a slew-rate change when a special data pattern is used. The flowchart is the same as the one shown in FIG. 6, showing a case in which a data pattern to be written on the dummy area is changed to "0000FFFF" in step S602 of FIG. 7 (see step S702). Because the magnetic disk device does not usually use such changed data pattern, once the procedure of slew-rate setting is over, the data pattern needs to be returned to the usual pattern (see step S708).

Thus it is possible to detect an accurate and most suitable pattern when occurrence of error with regards to a retry becomes obvious due to a use of a data pattern that is susceptible to make the most noise and enhances possibility of accuracy of comparative judgment regarding frequency of retry.

An explanation in the second embodiment is regarding setting of the slew rate of the interface signal based on the slew-rate setting value when the frequency of retry is considerably low.

In other words, in this case the read/write control unit 17a measures error rate for each slew-rate value instead of storing the frequency of retry, after measuring error rate for all slew-rate values compares each error rate and on the basis of a slew-rate which had smallest error rate value sets the slew rate of the interface signal that are to be transmitted later.

Following the previous method it is possible to find a slew-rate which makes it hard to originate retry when actual data read or write operation is performed, in the same way as in the case of judging on the basis of retry frequency.

Various processes explained in the embodiments can be implemented by executing a program prepared beforehand in processing devices such as a central processing unit (CPU), a micro control unit (MCU), and a micro processing unit (MPU) provided in the magnetic disk device (computer).

In an example shown in FIG. 2, each type of program used in each type of process (firmware) is stored in a ROM (not shown). The control unit 17 reads each program after it is loaded in the RAM 15 and executes it. After that, various processes of implementing functions of the processing units (the read/write control unit 17a and the slew-rate-change processing unit 17b) are started.

The various programs need not necessarily be stored in the ROM from the beginning, however, can be stored in portable physical media, which can be inserted into a computer such as a flexible disk (FD), a compact disk-read only memory (CD-ROM), a magneto-optical (MO) disk, a digital versatile disk (DVD), and an integrated-circuit (IC) card, or in fixed physical medium such as a hard disk drive (HDD), which is installed internally or externally in a computer, or in other computers (or servers), which can be attached to a computer via a public line, the Internet, a local area network (LAN), and a wide area network (WAN). And the computer can implement each program by reading from the media.

The explanation in the embodiments is regarding application of the present invention for the magnetic disk device. Although the invention has been described with respect to an application involving the magnetic disk device according to the embodiments, the invention is not to be thus limited to the application. The invention is also applicable, for example, to an optic disk device in the same manner.

Among the respective processes explained in the embodiment, all or part of the process explained as being performed automatically can be performed manually, or all or part of the process explained as being performed manually can be performed automatically with a known method.

The process procedures, the control procedures, specific names, data and information containing various parameters mentioned in the description and the drawings can be arbitrarily changed unless otherwise specified.

The constituent elements of the respective devices are functionally conceptual, and need not necessarily be configured physically as shown in the drawings. That is, the arrangement of the respective devices is not limited to that shown in the drawings, and can be functionally or physically separated or integrated partly or wholly according to the load or usage.

The same function of the respective devices can be entirely or partially realized by a CPU or a computer program executed by the CPU. The respective devices can also be implemented in wired-logic hardware.

As describe above, according to an embodiment of the present invention, an optimum slew-rate can be set regardless of the host device, and so the present invention is effective in preventing degradation of the performance of the device even in an environment easy to create noise in the control signal, due to any such cause including the electro magnetic interference (EMI).

Furthermore, according to an embodiment of the present invention, if an error occurs during a read or a write operation, the slew rate of the control signal is changed and a retry is executed. The slew rate of the successful retry is set as the slew rate of the control signal. It is possible to set the slew-rate based on the result of an actual data read or write operation, and it is possible to set an optimum slew rate regardless of the compatibility with the host device.

Moreover, according to an embodiment of the present invention, the frequency of the retry is calculated, on the basis of which slew-rate is changed and retry is executed. So it is possible to detect an optimum slew-rate by automatically changing the slew-rate with respect to the frequency of the retry.

Furthermore, according to an embodiment of the present invention, the frequency of the retry is calculated. If the calculated frequency is more than the threshold, re-retry is executed while changing the slew-rate. The slew rate of the executed re-retry that needed the minimum repetition is set as the slew rate of the control signal. Thus it is possible to detect a slew-rate that is not likely to create retry as a result of the actual data read or write.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A slew-rate control device that controls a slew rate of a control signal based on which data reading or data writing is performed with respect to a storage medium, the slew-rate control device comprising:
   a memory unit that preliminarily retains a plurality of slew-rate setting values;
   a processing unit that changes, when an error occurs during the data reading or the data writing, the slew rate of the control signal to one of the plurality of slew-rate setting values retained in the memory unit;
   a retry executing unit that executes a retry of the data reading or the data writing with the one of the plurality of slew-rate setting values changed by the processing unit; and
   a slew-rate setting unit that sets, as the slew rate of the control signal, a slew rate with which the retry is successfully executed.

2. The slew-rate control device according to claim 1, wherein:
   the processing unit counts a number of retries, and changes the slew-rate to one of the plurality of slew-rate setting values retained in the memory unit based on the counted number of retries.

3. The slew-rate control device according to claim 2, wherein:
   the processing unit changes the slew-rate sequentially to one of the plurality of slew-rate setting values retained in the memory unit when the counted number of retries exceeds a predetermined threshold, and
   the slew-rate setting unit sets, as the slew rate of the control signal, a slew rate with which the number of retries is minimized.

4. The slew-rate control device according to claim 2, wherein:
   the processing unit changes the slew-rate sequentially to one of the plurality of slew-rate setting values retained in the memory unit when the counted number of retries exceeds a predetermined threshold, and
   the slew-rate setting unit sets, as the slew rate of the control signal, a slew rate with which an error rate is minimized in the retry.

5. The slew-rate control device according to claim 3, wherein:
   the retry executing unit executes the retry when the control signal is not exchanged for a predetermined time.

6. The slew-rate control device according to claim 4, wherein:
   the retry executing unit executes the retry when the control signal is not exchanged for a predetermined time.

7. The slew-rate control device according to claim 3, wherein:
   the storage unit includes a dummy area in which predetermined data is written, and
   the retry executing unit executes the retry by using the predetermined data.

8. The slew-rate control device according to claim 4, wherein:
   the storage unit includes a dummy area in which predetermined data is written, and
   the retry executing unit executes the retry by using the predetermined data.

9. The slew-rate control device according to claim 7, wherein:
   the predetermined data is a data formed by combining a bit string of successive bits of "0" and a bit string of successive bits of "1".

10. The slew-rate control device according to claim 8, wherein:
    the predetermined data is a data formed by combining a bit string of successive bits of "0" and a bit string of successive bits of "1".

11. A storage device that controls a slew rate of a control signal based on which data reading or data writing is performed with respect to a storage medium, the storage device comprising:
    a memory unit that preliminarily retains a plurality of slew-rate setting values;
    a processing unit that changes, when an error occurs during the data reading or the data writing, the slew rate of the control signal to one of the plurality of slew-rate setting values retained in the memory unit;
    a retry executing unit that executes a retry of the data reading or the data writing with the one of the plurality of slew-rate setting values changed by the processing unit; and
    a slew-rate setting unit that sets, as the slew rate of the control signal, a slew rate with which the retry is successfully executed.

12. The storage device according to claim 11, wherein:
    the processing unit counts a number of retries, and changes the slew-rate to one of the plurality of slew-rate setting values retained in the memory unit based on the counted number of retries.

13. The storage device according to claim 12, wherein:
    the processing unit changes the slew-rate sequentially to one of the plurality of slew-rate setting values retained in the memory unit when the counted number of retries exceeds a predetermined threshold, and
    the slew-rate setting unit sets, as the slew rate of the control signal, a slew rate with which the number of retries is minimized.

14. The storage device according to claim 12, wherein:
    the processing unit changes the slew-rate sequentially to one of the plurality of slew-rate setting values retained in the memory unit when the counted number of retries exceeds a predetermined threshold, and
    the slew-rate setting unit sets, as the slew rate of the control signal, a slew rate with which an error rate is minimized in the retry.

15. A method of controlling a slew rate of a control signal based on which data reading or data writing is performed with respect to a storage medium, the method comprising:
    preliminarily retaining a plurality of slew-rate setting values;
    changing, when an error occurs during the data reading or the data writing, the slew rate of the control signal to one of the plurality of slew-rate setting values retained by the retaining step;
    executing a retry of the data reading or the data writing with the one of the plurality of slew-rate setting values changed by the changing step; and
    setting, as the slew rate of the control signal, a slew rate with which the retry is successfully executed.

16. The method according to claim 15, wherein the changing step further includes:
    counting number of retries; and
    changing the slew-rate to one of the plurality of slew-rate setting values based on the counted number of retries.

17. The method according to claim 16, wherein:

the changing step includes changing the slew-rate sequentially to one of the plurality of slew-rate setting values when the counted number of retries exceeds a predetermined threshold, and the setting step includes setting, as the slew rate of the control signal, a slew rate with which the number of retries is minimized.

18. The method according to claim 16, wherein:

the changing step includes changing the slew-rate sequentially to one of the plurality of slew-rate setting values when the counted number of retries exceeds a predetermined threshold, and the setting step includes setting, as the slew rate of the control signal, a slew rate with which an error rate is minimized in the retry.

* * * * *